United States Patent
Chen et al.

(10) Patent No.: US 11,000,889 B2
(45) Date of Patent: May 11, 2021

(54) METHODS FOR PREPARING ALTERNATING ARRANGEMENT SILVERCOPPER LATERAL COMPOSITE INGOT AND STRIP

(71) Applicant: WENZHOU HONGFENG ELECTRICAL ALLOY CO., LTD, Wenzhou (CN)

(72) Inventors: Xiao Chen, Wenzhou (CN); Yuxing Zhang, Wenzhou (CN); Zhoulei Zhang, Wenzhou (CN); Xinhe Wu, Wenzhou (CN); Chuan Qin, Wenzhou (CN); Gengxin Qi, Wenzhou (CN)

(73) Assignee: WENZHOU HONGFENG ELECTRICAL ALLOY CO., LTD, Wenzhou (CN)

( * ) Notice: Subject to any disclaimer, the term of this patent is extended or adjusted under 35 U.S.C. 154(b) by 0 days.

(21) Appl. No.: 16/768,274

(22) PCT Filed: Nov. 14, 2018

(86) PCT No.: PCT/CN2018/115340
§ 371 (c)(1),
(2) Date: May 29, 2020

(87) PCT Pub. No.: WO2019/109784
PCT Pub. Date: Jun. 13, 2019

(65) Prior Publication Data
US 2020/0290103 A1  Sep. 17, 2020

(30) Foreign Application Priority Data
Dec. 5, 2017 (CN) .......................... 201711269221.9

(51) Int. Cl.
*B21B 3/00* (2006.01)
*C22F 1/02* (2006.01)
*C22F 1/08* (2006.01)
*C22F 1/14* (2006.01)

(52) U.S. Cl.
CPC .................. *B21B 3/00* (2013.01); *C22F 1/02* (2013.01); *C22F 1/08* (2013.01); *C22F 1/14* (2013.01); *B21B 2003/005* (2013.01)

(58) Field of Classification Search
CPC ................. B21B 3/00; C22F 1/02; C22F 1/08
(Continued)

(56) References Cited

U.S. PATENT DOCUMENTS 5,042,711 A    8/1991 Iskenderian et al.

FOREIGN PATENT DOCUMENTS

CN        1583303 A      2/2005
CN      101318286 A     12/2008
(Continued)

OTHER PUBLICATIONS

CN101670365A English translation by machine. (Year: 2020).*
(Continued)

*Primary Examiner* — Nicholas A Wang
*Assistant Examiner* — Jiangtian Xu
(74) *Attorney, Agent, or Firm* — Bayramoglu Law Offices LLC (57) ABSTRACT

A method for preparing an alternating arrangement silver-copper lateral composite ingot, including: using a concave roller set; manufacturing a copper frame having a fixed width according to a negative tolerance of a width of the grooves of the concave roller, and corresponding copper bars and silver bars, and performing a surface treatment on the copper frame, the copper bars, and the silver bars; and then arranging different number of copper bars and silver bars at internals as needed and tightly placing into the copper frame to form a composite blank, i.e., a composite ingot. A method for preparing an alternating arrangement silver-copper lateral composite strip is further provided, and the silver-copper lateral composite ingot prepared by the
(Continued)

method for preparing the alternating arrangement silver-copper lateral composite ingot is used to prepare the silver-copper lateral composite strip.

17 Claims, 3 Drawing Sheets

(58) Field of Classification Search
USPC .......................................................... 148/536
See application file for complete search history.

(56) References Cited

FOREIGN PATENT DOCUMENTS

| | | | |
|---|---|---|---|
| CN | 101670365 A | * | 3/2010 |
| CN | 101670365 A | | 3/2010 |
| CN | 102814324 A | * | 12/2012 |
| CN | 102814324 A | | 12/2012 |
| CN | 103464505 A | | 12/2013 |
| CN | 108080414 A | | 5/2018 |
| CN | 207577122 U | | 7/2018 |
| JP | H0357503 A | | 3/1991 |

OTHER PUBLICATIONS

CN102814324 English translation by machine. (Year: 2020).*
Li Zhong-Cai, et al., Study on Manufacturing Process and Properties of Cross-layered Ag/Cu Composite for Fuse, Electro-Optic Materials, 2013, pp. 36-38, No. 4.

* cited by examiner

METHODS FOR PREPARING ALTERNATING ARRANGEMENT SILVERCOPPER LATERAL COMPOSITE INGOT AND STRIP

CROSS REFERENCE TO THE RELATED APPLICATIONS

This application is the national phase entry of International Application No. PCT/CN2018/115340, filed on Nov. 14, 2018, which is based upon and claims priority to Chinese Patent Application No. 201711269221.9, filed on Dec. 5, 2017, the entire contents of which are incorporated herein by reference.

TECHNICAL FIELD

The present invention relates to the field of the preparation of dissimilar metal composite strips, and in particular relates to methods for preparing an alternating arrangement silver-copper lateral composite ingot and a strip thereof.

BACKGROUND

A fuse is a device which interrupts a circuit when a current exceeds a predetermined value by melting due to a self-generated heat. The fuse is one of the most widely used protection devices to prevent short circuits and overcurrent in high-voltage and low-voltage power distribution systems, control systems and electrical equipment.

Silver has long been used as a main material for manufacturing a fuse. The use of pure silver in the fuse is a waste of scarce resources and increases production costs. With the development of modern material composite techniques, various new processes capable of achieving a stable composite of different materials have emerged such as cold bonding, hot bonding, explosive welding, and others. Through these processes, materials of different properties are combined into a composite material with properties that surpass properties of the individual materials. Composite materials that can replace the fuse made of pure silver have been developed based on principles of modern composite techniques.

The Chinese patent "Preparation method of lateral compound silver-copper composite strip" (the publication number is CN 102814324 A, and the application number is CN201210314140.7) discloses the method to obtain a silver-copper composite material by embedding a silver strip into a copper plate in an inlay method, and then applying a cold bonding method. However, the non-rolling direction of the material strip cannot be restrained in the production process, which causes an insufficient interaction between the silver and the copper, resulting in weak bonding. Moreover, in the production process, the copper plate should be processed several times, which is cumbersome, complicated, and increases the production cost.

In addition, a Chinese patent application "Method of manufacturing alternating arrangement lateral composite board band and mould hot-press arrangement thereof" (the publication number is CN101318286A, and the application number is CN200810040137.4) is provided. However, this method has a complicated production process, has a high cost in a mass production process, and the uniformity of the width of the hot rolled composite strip is difficult to control.

SUMMARY

In view of the drawbacks in the prior art, the objective of the present invention is to provide methods for preparing an alternating arrangement silver-copper lateral composite ingot and strip thereof. Such methods for preparing an alternating arrangement silver-copper lateral composite ingot and strip would improve the bonding strength between silver and copper, and simplify the production process. These methods will yield stable manufacturing performance and enable large-scale production.

According to the first objective of the present invention, a method for preparing an alternating arrangement silver-copper lateral composite ingot is provided, which splices composite ingots made of silver-copper dissimilar metals by an alternating arrangement lateral composite method, including:

using a concave roller set, wherein the concave roller set is a pair of working rollers in a roller system of a four-roller solid-phase rolling mill, and grooves are provided at center positions of the working rollers;

manufacturing a copper frame having a fixed width according to a negative tolerance of a width of the groove of the concave roller, and corresponding copper bars and silver bars, and performing a surface treatment on the copper frame, the copper bars, and the silver bars; and then arranging different numbers of copper bars and silver bars at intervals as needed, and tightly placing into the copper frame to form a composite blank, i.e., a composite ingot.

Preferably, the surface treatment is degreasing treatment and surface grinding treatment.

Preferably, the copper frame and the copper bars are subject to softening annealing treatment in a furnace protected by gas before the surface treatment, to increase the material uniformity and fluidity in subsequent processing.

More preferably, in softening annealing treatment, the annealing temperature is set to be equal to or more than a recrystallization temperature of the material, ranging from 500° C. to 800° C., the gas is hydrogen atmosphere, and gas pressure in the furnace is greater than an atmospheric pressure, the gas flow rate ranges from 0.4 $m^3$/h to 0.6 $m^3$/h, preventing oxidation of the material, and the annealing time ranges from 1 hour to 3 hours.

Preferably, for the concave roller, the groove has a width of 130-160 mm and the depth is 3-6 mm. At present, the prepared products having the maximum width ranging from 120 mm to 130 mm can produce a fuse that protects circuits against heavy current. Therefore, selecting the width of 130-160 mm and the depth of 3-6 mm meets customer's requirement, and at the same time meets the requirements of the process.

Preferably, the copper frame has the length L ranging from 500 mm to 2000 mm, the width W ranging from 129 mm to 139 mm, and the thickness h ranging from 6 mm to 40 mm. An optimization dimension allows the copper frame to be stressed uniformly in all directions during the process to ensure the integrity and reliability of the material.

Preferably, the copper bars and the silver bars are obtained by cutting after extrusion forming, having the length L1 equal to L minus 50 mm, the thickness equal to the thickness of the copper frame, and the width W1 of 3 mm to 50 mm.

The method adopts a concave roll set, and the bonding strength of the composite strip at the interface of silver and copper is effectively improved by improving the roll system of the solid-phase rolling mill. Meanwhile, the ingot made by the alternating arrangement lateral composite method has the characteristics of simple structure and easy alternate arrangement, which optimizes the subsequent processing technology and shortens the production cycle.

According to the second objective of the present invention, a method for preparing the alternating arrangement silver-copper lateral composite strip is provided, which uses the above silver-copper lateral composite ingot as the raw material, the method includes the following steps:

S1: limiting the composite ingot by the grooves of the concave rollers, and performing a cold bonding with the deformation amount X ranging from 50% to 85% on the composite ingot to form an alternating arrangement silver-copper lateral composite strip;

the key of this step is the limiting of the concave roller to the composite ingot, so that the silver-copper interface is fully extruded and deformed during rolling, and a preliminary physically mechanical engagement is formed on a newly formed silver-copper interface.

Preferably, in this step, the deformation amount X is equal to (h−h1)/h, where h is the thickness of the composite ingot, and h1 is the thickness of the alternating arrangement silver-copper lateral composite strip. The rolling in this process is one-pass formation.

S2: performing a diffusion annealing treatment on the alternating arrangement silver-copper lateral composite strip obtained in step S1 under a protective atmosphere, so that a bonding mode between interfaces of silver and copper is changed from the preliminary mechanical engagement to a combined action of the mechanical engagement and a metallurgical bonding, further improving the bonding strength.

Preferably, in the diffusion annealing treatment performed under the protective atmosphere, the annealing temperature ranges from 500° C. to 800° C., the protective gas is hydrogen gas and the gas pressure in the furnace is greater than the atmospheric pressure, the gas flow rate ranges from 0.4 $m^3$/h to 0.6 $m^3$/h, and the annealing time ranges from 3 hours to 8 hours. With this preferred parameter design, it is feasible to obtain a product with a strong bonding strength without generating a relatively large resistance due to a large thickness of the diffusion layer, which has a crucial effect on the further improvement of the performance of the final alternating arrangement silver-copper lateral composite strip of the present invention.

S3: performing a multi-pass rolling on the lateral composite strip obtained after the diffusion annealing treatment in the step S2 using the four-roller reversible rolling mill.

Preferably, in the multi-pass rolling, the deformation amount Xn of each pass is controlled to range from 10% to 15%, and the total deformation amount Y is controlled to range from 30% to 60%.

More preferably, the total deformation amount Y is equal to the sum of X1+X2+ . . . +Xn, and the deformation amount of each pass is a ratio of the change amount of the thickness of the composite strip at an end of the each pass to a thickness of the composite strip before performing the multi-pass rolling.

S4: carrying out a softening annealing treatment on the strip after being rolled in step S3 under a controllable atmosphere to obtain the alternating arrangement silver-copper lateral composite strip.

Preferably, in softening annealing treatment under the controllable atmosphere, the annealing temperature ranges from 400° C. to 600° C., the atmosphere is hydrogen gas and the gas pressure in the furnace is greater than the atmospheric pressure, the gas flow rate ranges from 0.4 $m^3$/h to 0.6 $m^3$/h, and the annealing time ranges from 2 hours to 6 hours. The preferred parameters are designed such that the annealing temperature is equal to or higher than the recrystallization temperature of the material and lower than the solidus temperature of the Ag—Cu alloy, and the annealing time is appropriate, which can remove the rolling texture of the material without rapidly diffusing to form a thick diffusion layer, having the crucial effect on the further improvement of the performance of the final alternating arrangement silver-copper lateral composite strip of the present invention.

Further, after step S4 is completed, the method may further include step S5: performing finish machining on the strip obtained after step S4 using a four-roller reversible finishing mill to obtain the final strip with the thickness ranging from 0.05 mm to 0.3 mm.

Compared to the prior art, the present invention has the following advantages:

1. The composite ingot prepared by the alternating arrangement lateral composite method has the properties of simple structure and easy splicing, so that the subsequent processing is optimized and the production cycle is shortened.

2. Further, in the present invention, the bonding strength of the silver-copper lateral composite strip is effectively improved by improving the roller system of the solid-phase rolling mill, i.e., providing the grooves at the center positions of the working rollers.

3. Further, according to the steps of the method of the present invention, the phenomena such as strip cracking, silver layer shift and the like are effectively reduced. Moreover, the performance of the final product is ensured to be superior by using the design of the preferred process and the parameters thereof. For example, in the present invention, the oxide on the surface of the material strip is reduced in the furnace by using the annealing process under the hydrogen protection, thereby achieving the effect of bright annealing of the strip.

In summary, the above method of the present invention can improve the bonding strength between silver and copper, simplify the production process, shorten the production cycle, and greatly improve the production efficiency, thereby further enabling one to deliver products with stable manufacturing performance and reaching large-scale production.

BRIEF DESCRIPTION OF THE DRAWINGS

Other features, objectives and advantages of the present invention will become more apparent by reading the detailed description of the non-limiting embodiments and referring to the following drawings.

DETAILED DESCRIPTION OF THE EMBODIMENTS

The present invention is described in detail in combination with specific embodiments. The following embodiments are intended to help those skilled in the art to further understand the present invention, but are not intended to limit the present invention in any way. It should be noted that, a number of variations and modifications may be made by those skilled in the art without departing from the inventive concept of the present invention, which all fall in the protective scope of the present invention.

Figure 1:
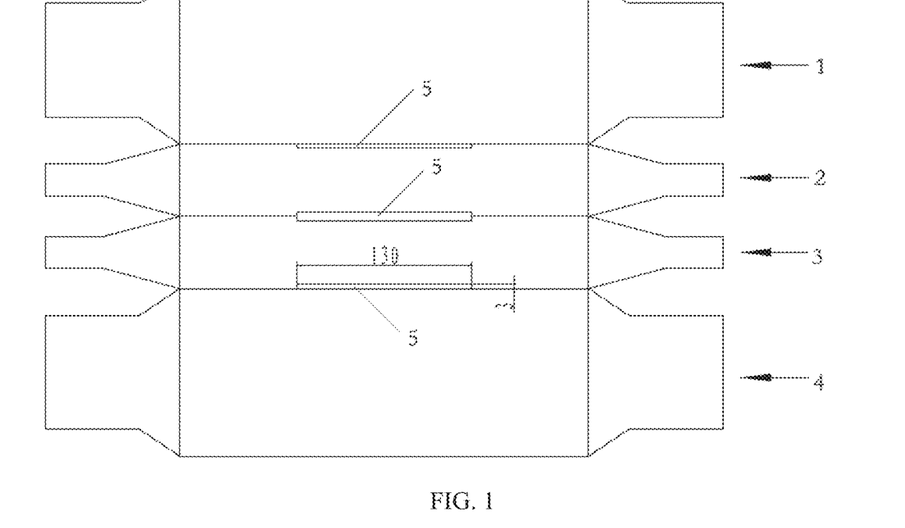
FIG. 1 is a structural schematic diagram of a concave roller set according to an embodiment of the present invention.

FIG. 1 is the structural schematic diagram of a concave roller set used in parts of the embodiments of the present invention. In FIG. 1, the upper backup roll 1, the first concave roller 2, the second concave roller 3, and the lower backup roll 4 are provided. The concave roller set (the first concave roller 2 and the second concave roller 3) is a pair of working rollers in a roll system of a four-roller solid-phase rolling mill. Grooves 5 are provided at central positions of the first concave roller 2 and the second concave roller 3. FIG. 1 shows a specific embodiment in which the grooves 5 arranged in the first concave roller 2 and the second concave roller 3 have a width of 130 mm and a depth of 3 mm. In other embodiments, the first concave roller 2 and the second concave roller 3 of the present invention may also be configured to have other parameters, and the objective of the present invention can be achieved as long as the grooves are configured to have a width of 130-160 mm and a depth of 3-6 mm.

In the present invention, a copper frame having a fixed width according to a negative tolerance of the width of the grooves of the concave rollers, and corresponding copper bars and silver bars are manufactured, and a surface treatment is performed on the copper frame, the copper bars, and the silver bars. Then, different number of copper bars and silver bars are arranged at intervals as needed and tightly placed into the copper frame to form a composite blank, i.e., a composite ingot.

In the present invention, the copper frame may be of various shapes, preferably a regular shape, such as a rectangular copper frame. For the rectangular copper frame, the following parameters may be set: the length L ranges from 500 mm to 2000 mm, the width W ranges from 129 mm to 129.5 mm, and the thickness h ranges from 6 to 40 mm. Obviously, in other embodiments, other shapes may also be used, and the specific shape is set according to practical requirements.

In the present invention, the copper bars and the silver bars are obtained by cutting after forming an extrusion, having the length L1 equal to L minus 50 mm, the thickness equal to the thickness of the copper frame, and the width W1 of 3 mm to 50 mm. The specific number of copper bars and silver bars may be set according to practical requirements.

In order to better understand the technical solution of the present invention, the following detailed description of the embodiments is provided by using the above concave rollers. In the following embodiments, the method for preparing a composite strip combining two silver plates, one copper plate and one copper frame is given as an example. Specifically:

The copper frame is prepared according to the size of the grooves of the concave rollers:

the copper plate having the width of 129.5 mm, the length of 1000 mm, and the height of 20 mm is subjected to finish milling by a milling machine to obtain a rectangular groove having the width of 46.65 mm, the length of 950 mm, and the height of 20 mm with rounded corners.

The copper bars and silver bars are prepared according to the drawings:

the copper bars: 11.55 mm (width)×950 mm (length)×20 mm (height); and the silver bars: 3 mm (width)×950 mm (length)×20 mm (height).

The parameters of the above specific copper frame, copper bar and silver bar are used in a part of embodiments of the present invention, which are not intended to limit the number and size of the copper frame, the copper bar and the silver bar of the present invention, but are merely for the sake of a better description of the invention.

Embodiment 1

In this embodiment, a method for preparing an alternating arrangement silver-copper lateral composite ingot is provided, and a method for preparing a strip is further provided based on the prepared silver-copper lateral composite ingot. Specifically, the method includes the following steps:

(1) The composite ingots composed of silver-copper dissimilar metals are spliced by an alternating arrangement method.

After the copper bars, the silver bars and the copper frame are prepared, a half of the copper bars, the silver bars and the copper frame are subjected to treatments of degreasing and surface grinding, and the other half of the copper bars are not performed with the surface treatment. Then, the two raw materials subjected to different treatments are respectively made into composite blanks, i.e., alternating arrangement silver-copper lateral composite ingots.

(2) A cold bonding with a deformation amount of 70% is performed on the above composite ingots by using a four-roller solid-phase rolling mill to form alternating arrangement silver-copper lateral composite strips. A product prepared by the raw materials subjected to the surface treatment has closely attached interface during the rolling process, while a product without the surface treatment presents an interface cracking during the rolling process, showing that the surface treatment can significantly improve the bonding strength of the product.

(3) The product prepared by the raw materials subjected to the surface treatment in step (2) is rolled, and the lateral composite strip obtained by the rolling is subjected to a diffusion annealing treatment under the protective atmosphere.

In this embodiment, the annealing temperature is 750° C., the protective gas is hydrogen gas (a gas pressure in a furnace is greater than an atmospheric pressure), the gas flow rate ranges from 0.4 m³/h to 0.6 m³/h, and the annealing time is 4 hours.

(4) Four-pass rolling is performed on the lateral composite strip after the diffusion annealing treatment using the four-roller reversible rolling mill. In this embodiment, the deformation amount of each pass is controlled at 12%, and the total deformation amount is controlled at about 50%.

(5) The strip obtained after step (4) is subjected to softening annealing treatment under the controllable atmosphere, and the annealing temperature is 600° C., and the atmosphere is hydrogen gas (a gas pressure in a furnace is greater than the atmospheric pressure), the gas flow rate ranges from 0.4 m³/h to 0.6 m³/h, and the annealing time is 4 hours.

Figure 2:
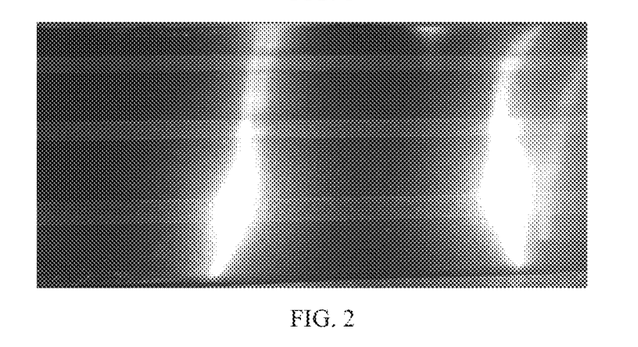
FIG. 2 is a photograph of the product prepared according to Embodiment 1 of the present invention.

(6) The strip obtained after step (5) is subjected to the finish machining on a four-roller reversible finishing mill to obtain the final thickness of 0.1 mm. After inspection, the strip passes through the inspection tool without leaking copper (as shown in FIG. 2), and the performance meets the requirements in the drawings.

In the present invention, the raw materials are subjected to the surface treatment, so that the contact surfaces of different kinds of the materials have no oil stains and impurities, and the surface grinding helps the formation of the diffusion layer, which can effectively reduce the cracking of the strip and increase the bonding strength. The above method of the present invention can improve the bonding strength between silver and copper, simplify the production process, shorten the production cycle, and greatly improve the production efficiency, thereby further meeting the practical requirements for stable manufacturing performance and large-scale production.

Embodiment 2

In this embodiment, a method for preparing an alternating arrangement silver-copper lateral composite ingot is provided, and a method for preparing a strip is further provided based on the prepared silver-copper lateral composite ingot. Specifically, the method includes the following steps:

(1) The composite ingots composed of silver-copper dissimilar metals are spliced by an alternating arrangement method.

After the copper bars, the silver bars and the copper frame are prepared, the corresponding copper bars, the silver bars and the copper frame are subjected to a softening annealing treatment, the annealing temperature is 600° C., the protective gas is hydrogen gas (the gas pressure in the furnace is greater than the atmospheric pressure), the gas flow rate ranges from 0.4 m$^3$/h to 0.6 m$^3$/h, and the annealing time is 2 hours. After that, treatments of degreasing and surface grinding are performed. Then, two silver plates and one copper plate are arranged at intervals and tightly placed into a rectangular copper frame to form the composite blank, i.e., the alternating arrangement silver-copper lateral composite ingot.

(2) A cold bonding with the deformation amount of 70% is performed on the above composite ingot by using the four-roller solid-phase rolling mill to form the alternating arrangement silver-copper lateral composite strip.

(3) The product prepared by the raw materials subjected to the surface treatment in step (2) is rolled, and the lateral composite strip obtained by the rolling is subjected to a diffusion annealing treatment under the protective atmosphere.

In this embodiment, the annealing temperature is 550° C., the protective gas is hydrogen gas (a gas pressure in a furnace is greater than an atmospheric pressure), the gas flow rate ranges from 0.4 m$^3$/h to 0.6 m$^3$/h, and the annealing time is 6 hours.

(4) Four-pass rolling is performed on the lateral composite strip after the diffusion annealing treatment on the four-roller reversible rolling mill. In this embodiment, the deformation amount of each pass is controlled at 15%, and the total deformation amount is controlled at about 60%.

(5) The strip obtained after step (4) is subjected to a softening annealing treatment under the controllable atmosphere, and the annealing temperature is 450° C., and the atmosphere is hydrogen gas (a gas pressure in a furnace is greater than an atmospheric pressure), the gas flow rate ranges from 0.4 m$^3$/h to 0.6 m$^3$/h, and the annealing time is 2 hours.

Figure 3:
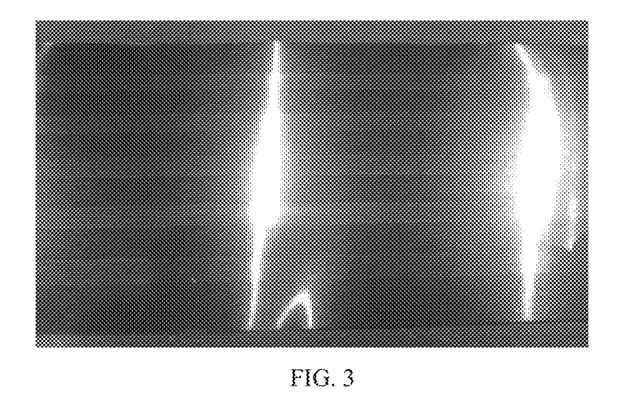
FIG. 3 is a photograph of the product prepared according to Embodiment 2 of the present invention.

(6) The strip obtained after step (5) is subjected to a finish machining by the four-roller reversible finishing mill to obtain the final thickness of 0.1 mm. After inspection, the strip passes through the inspection tool without leaking copper (as shown in FIG. 3), and the performance meets the requirements in the drawings.

In the present invention, the raw materials are subjected to the softening annealing treatment, so that the fluidity of the material is relatively good. During the rolling process, the raw materials are extended synchronously during the rolling process with the deformation amount of 50%-85%, and the interfaces tightly contact, which helps to increase the diffusion speed and increase the bonding strength. Moreover, the problem of interface oxidation caused by local cracking inside the product due to the unsynchronized flow of raw materials during the rolling process is alleviated, and the quality of the product is improved. The above method of the present invention can improve the bonding strength between silver and copper, and improve the uniformity and stability of the product as well, meeting the practical requirements for large-scale production.

Embodiment 3

In this embodiment, a method for preparing an alternating arrangement silver-copper lateral composite ingot is provided, and a method for preparing a strip is further provided based on the prepared silver-copper lateral composite ingot. Specifically, the method includes the following steps:

(1) The composite ingots composed of silver-copper dissimilar metals are spliced by an alternating arrangement method.

After the copper bars, the silver bars and the copper frame are prepared, the corresponding copper bars, the silver bars and the copper frame are subjected to a softening annealing treatment, the annealing temperature is 550° C., the protective gas is hydrogen gas (the gas pressure in a furnace is greater than the atmospheric pressure), the gas flow rate ranges from 0.4 m$^3$/h to 0.6 m$^3$/h, and the annealing time is 3 hours. After that, treatments of degreasing and surface grinding are performed. Then, two silver plates and one copper plate are arranged at intervals and tightly placed into a rectangular copper frame to form the composite blank, i.e., an alternating arrangement silver-copper lateral composite ingot.

(2) A cold bonding with the deformation amount of 60% is performed on the above composite ingot by using a four-roller solid-phase rolling mill to form the alternating arrangement silver-copper lateral composite strip.

(3) The product prepared by rolling in the step (2) is subjected to the diffusion annealing treatment under the protective atmosphere, the annealing temperature is 750° C., the protective gas is hydrogen gas (the gas pressure in a furnace is greater than the atmospheric pressure), the gas flow rate ranges from 0.4 m$^3$/h to 0.6 m$^3$/h, and the annealing time is 3 hours.

(4) Five-pass rolling is performed on the lateral composite strip after the diffusion annealing treatment on the four-roller reversible rolling mill, the deformation amount of each pass is controlled at 10%, and the total deformation is controlled at about 40%.

(5) The strip obtained after step (4) is subjected to a softening annealing treatment under the controllable atmosphere, and the annealing temperature is 400° C., and the atmosphere is hydrogen gas (the gas pressure in the furnace is greater than the atmospheric pressure), the gas flow rate ranges from 0.4 m$^3$/h to 0.6 m$^3$/h, and the annealing time is 6 hours.

Figure 4:
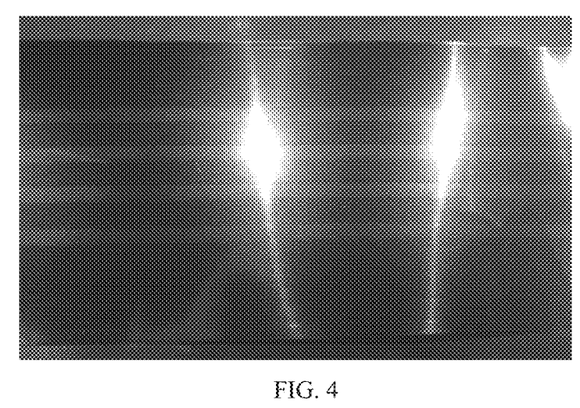
FIG. 4 is a photograph of the product prepared according to Embodiment 3 of the present invention.

(6) The strip obtained after step (5) is subjected to a finish machining on a four-roller reversible finishing mill to obtain the final thickness of 0.1 mm. After inspection, the strip passes through the inspection tool without leaking copper (as shown in FIG. 4), and the performance meets the requirements in the drawings.

In the present invention, by controlling the rolling deformation amount at 50%-85%, the bonding strength and the finished product rate of the product can be effectively controlled. If the deformation amount of the composite is too low, an effective mechanical bonding interface cannot be formed between the materials, and an intermolecular force cannot be formed microscopically, so that the diffusion layer becomes thin and the bonding strength becomes weak. If the deformation amount is too high, the product will have unrecoverable defects, including internal cracking, which will eventually lead to a product having substandard performance.

Embodiment 4

In this embodiment, a method for preparing an alternating arrangement silver-copper lateral composite ingot is provided, and a method for preparing a strip is further provided based on the prepared silver-copper lateral composite ingot. Specifically, the method includes the following steps:

(1) The composite ingots composed of silver-copper dissimilar metals are spliced by an alternating arrangement method.

After the copper bars, the silver bars and the copper frame are prepared, the corresponding copper bars, the silver bars and the copper frame are subjected to a softening annealing treatment, the annealing temperature is 650° C., the protective gas is hydrogen gas (the gas pressure in the furnace is greater than the atmospheric pressure), the gas flow rate ranges from 0.4 $m^3$/h to 0.6 $m^3$/h, and the annealing time is 2 hours. After that, treatments of degreasing and surface grinding are performed. Then, two silver plates and one copper plate are arranged at intervals and tightly placed into a rectangular copper frame to form the composite blank, i.e., an alternating arrangement silver-copper lateral composite ingot.

(2) A cold bonding with the deformation amount of 70% is performed on the above composite ingot by using a four-roller solid-phase rolling mill to form an alternating arrangement silver-copper lateral composite strip.

(3) The lateral composite strip obtained in step (2) is subjected to a diffusion annealing treatment under the protective atmosphere, the annealing temperature is 600° C., the protective gas is hydrogen gas (the gas pressure in the furnace is greater than the atmospheric pressure), the gas flow rate ranges from 0.4 $m^3$/h to 0.6 $m^3$/h, and the annealing time is 1 hour.

(4) Five-pass rolling is performed on the lateral composite strip after the diffusion annealing treatment on the four-roller reversible rolling mill, the deformation amount of each pass is controlled at 12%, and the total deformation is controlled at about 50%.

(5) The strip obtained after step (4) is subjected to a softening annealing treatment under the controllable atmosphere, and the annealing temperature is 450° C., and the atmosphere is hydrogen gas (the gas pressure in the furnace is greater than the atmospheric pressure), the gas flow rate ranges from 0.4 $m^3$/h to 0.6 $m^3$/h, and the annealing time is 2 hours.

Figure 5:
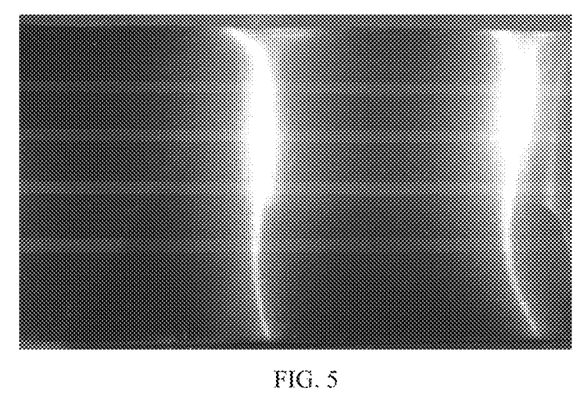
FIG. 5 is a photograph of the product prepared according to Embodiment 4 of the present invention.

(6) The strip obtained after step (5) is subjected to a finish machining on a four-roller reversible finishing mill to obtain the final thickness of 0.1 mm. After inspection, the strip passes through the inspection tool without leaking copper (as shown in FIG. 5), and the performance meets the requirements in the drawings.

In the present invention, the thickness of the interface layer can be effectively controlled by designing the parameters of the diffusion annealing process. The material obtained above is fused the heat generated by the resistance, thereby interrupting the circuit and therefore providing circuit protection. The material is extremely sensitive to resistance. As the temperature increases, the thermal motion intensity also increases. The heat diffusion intensity increases with the increasing time. A thicker diffusion layer, causes to have more intermetallic compounds to be formed, and as a result the resistance increases. The effective diffusion layer cannot be formed in low temperature, in a short time and in non-intense thermal motion, resulting in an insufficient bonding strength. The above method of the present invention can produce a reasonable diffusion layer, which meets the requirements of a user besides the strength requirement.

Embodiment 5

In this embodiment, a method for preparing an alternating arrangement silver-copper lateral composite ingot is provided, and a method for preparing a strip is further provided based on the prepared silver-copper lateral composite ingot. Specifically, the method includes the following steps:

(1) The composite ingots composed of silver-copper dissimilar metals are spliced by an alternating arrangement method.

After the copper bars, the silver bars and the copper frame are prepared, the corresponding copper bars, the silver bars and the copper frame are subjected to a softening annealing treatment, the annealing temperature is 600° C., the protective gas is hydrogen gas (the gas pressure in the furnace is greater than the atmospheric pressure), the gas flow rate ranges from 0.4 $m^3$/h to 0.6 $m^3$/h, and the annealing time is 3 hours. After that, treatments of degreasing and surface grinding are performed. Then, two silver plates and one copper plate are arranged at intervals and tightly placed into the rectangle copper frame to form a composite blank, i.e., an alternating arrangement silver-copper lateral composite ingot.

(2) A cold bonding with the deformation amount of 75% is performed on the above composite ingot by a four-roller solid-phase rolling mill to form an alternating arrangement silver-copper lateral composite strip.

(3) The lateral composite strip obtained by rolling in step (2) is subjected to a diffusion annealing treatment under the protective atmosphere, the annealing temperature is 650° C., the protective gas is hydrogen gas (a gas pressure in a furnace is greater than an atmospheric pressure), the gas flow rate ranges from 0.4 $m^3$/h to 0.6 $m^3$/h, and the annealing time is 1 hour.

(4) Five-pass rolling is performed on the lateral composite strip after the diffusion annealing treatment on the four-roller reversible rolling mill, the deformation amount of each pass is controlled at 13%, and the total deformation is controlled at about 52%.

(5) The strip obtained after step (4) is subjected to a softening annealing treatment under the controllable atmosphere, the annealing temperature is 400° C., the atmosphere is hydrogen gas (the gas pressure in the furnace is greater than the atmospheric pressure), the gas flow rate ranges from 0.4 $m^3$/h to 0.6 $m^3$/h, and the annealing time is 2.5 hours.

Figure 6:
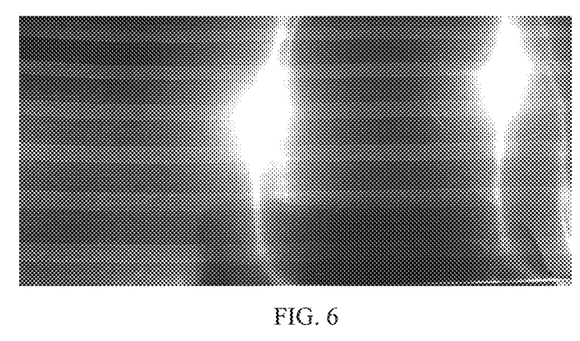
FIG. 6 is a photograph of the product prepared according to Embodiment 5 of the present invention.

(6) The strip obtained after step (5) is subjected to a finish machining on a four-roller reversible finishing mill to obtain the final thickness of 0.1 mm. After inspection, the strip passes through the inspection tool without leaking copper (as shown in FIG. 6), and the performance meets the requirements in the drawings.

In the present invention, by controlling the total deformation amount of the cold rolling and the deformation amount of each pass, the processing time is reduced and the processing cycle is shortened while satisfying the positioning of the silver layer. Because of the different deformation amounts, the width spreads of the materials and the accumulations of the internal stresses of the materials are different. If the deformation amount is too small, the processing cycle is long, and the width spread is large. If the deformation amount is too large, the material will have an unrecoverable internal defect, which will have a certain effect on the performance of the product. The above method of the present invention improves production efficiency by using the processing technique disclosed.

Embodiment 6

In this embodiment, a method for preparing an alternating arrangement silver-copper lateral composite ingot is provided, and a method for preparing a strip is further provided based on the prepared silver-copper lateral composite ingot. Specifically, the method includes the following steps:

(1) The composite ingots composed of silver-copper dissimilar metals are spliced by an alternating arrangement method.

After the copper bars, the silver bars and the copper frame are prepared, the corresponding copper bars, the silver bars and the copper frame are subjected to a softening annealing treatment, the annealing temperature is 550° C., the protective gas is hydrogen gas (the gas pressure in the furnace is greater than the atmospheric pressure), the gas flow rate ranges from 0.4 $m^3$/h to 0.6 $m^3$/h, and the annealing time is 4 hours. After that, treatments of degreasing and surface grinding are performed. Then, two silver plates and one copper plate are arranged at intervals and tightly placed into a rectangle copper frame to form a composite blank, i.e., an alternating arrangement silver-copper lateral composite ingot.

(2) A cold bonding with the deformation amount of 60% is performed on the above composite ingot by using a four-roller solid-phase rolling mill to form an alternating arrangement silver-copper lateral composite strip.

(3) The lateral composite strip obtained by rolling in step (2) is subjected to a diffusion annealing treatment under the protective atmosphere, the annealing temperature is 550° C., the protective gas is hydrogen gas (the gas pressure in the furnace is greater than the atmospheric pressure), the gas flow rate ranges from 0.4 $m^3$/h to 0.6 $m^3$/h, and the annealing time is 2 hours.

(4) Five-pass rolling is performed on the lateral composite strip after the diffusion annealing treatment on the four-roller reversible rolling mill, the deformation amount of each pass is controlled at 12%, and the total deformation is controlled at about 48%.

(5) The strip obtained after step (4) is subjected to a softening annealing treatment under the controllable atmosphere, the annealing temperature is 450° C., and the atmosphere is hydrogen gas (the gas pressure in the furnace is greater than the atmospheric pressure), the gas flow rate ranges from 0.4 $m^3$/h to 0.6 $m^3$/h, and the annealing time is 2 hours.

Figure 7:
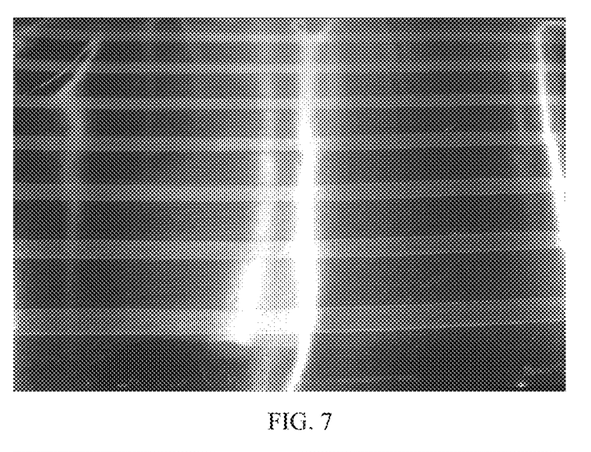
FIG. 7 is a photograph of the product prepared according to Embodiment 6 of the present invention.

(6) The strip obtained after step (5) is subjected to a finish machining on a four-roller reversible finishing mill to obtain the final thickness of 0.1 mm. After inspection, the strip passes through the inspection tool without leaking copper (as shown in FIG. 7), and the performance meets the requirements in the drawings.

In the present invention, the product that meets the user's requirement for mechanical properties is obtained by controlling the softening annealing. Different temperatures in the softening annealing have different effects on the texture, grain and internal stress of the material. If the temperature is low, and the time is short, the tempering is not thorough in the softening annealing, the material cannot be recrystallized, and the processing texture cannot be removed, which may cause the product to break during the processing. If the temperature is high and the time is long in the softening annealing, a secondary recrystallization may be caused in the material, and large crystal grains appear, which affects the strength of the material. The above method of the present invention prepares a product that meets the requirements of the user by the disclosed processing.

Embodiment 7

In this embodiment, a method for preparing an alternating arrangement silver-copper lateral composite ingot is provided, and a method for preparing a strip is further provided based on the prepared silver-copper lateral composite ingot. Specifically, the method includes the following steps:

(1) The composite ingots composed of silver-copper dissimilar metals are spliced by an alternating arrangement method.

After the copper bars, the silver bars and the copper frame are prepared, the corresponding copper bars, the silver bars and the copper frame are subjected to a softening annealing treatment, the annealing temperature is 550° C., the protective gas is hydrogen gas (the gas pressure in the furnace is greater than the atmospheric pressure), the gas flow rate ranges from 0.4 $m^3$/h to 0.6 $m^3$/h, and the annealing time is 4 hours. After that, treatments of degreasing and surface grinding are performed. Then, two silver plates and one copper plate are arranged at intervals and tightly placed into a rectangle copper frame to form a composite blank, i.e., an alternating arrangement silver-copper lateral composite ingot.

(2) A cold bonding with the deformation amount of 65% is performed on the above composite ingot by using a four-roller solid-phase rolling mill to form an alternating arrangement silver-copper lateral composite strip.

(3) The lateral composite strip obtained by rolling in step (2) is subjected to a diffusion annealing treatment under the protective atmosphere, the annealing temperature is 650° C., the protective gas is hydrogen gas (the gas pressure in the furnace is greater than the atmospheric pressure), the gas flow rate ranges from 0.4 $m^3$/h to 0.6 $m^3$/h, and the annealing time is 1.5 hours.

(4) Five-pass rolling is performed on the lateral composite strip after the diffusion annealing treatment on the four-roller reversible rolling mill, the deformation amount of each pass is controlled at 14%, and the total deformation is controlled at about 56%.

(5) The strip obtained in step (4) is subjected to a softening annealing treatment under the controllable atmosphere, the annealing temperature is 500° C., the atmosphere is hydrogen gas (the gas pressure in the furnace is greater than the atmospheric pressure), the gas flow rate ranges from 0.4 $m^3$/h to 0.6 $m^3$/h, and the annealing time is 2.5 hours.

Figure 8:
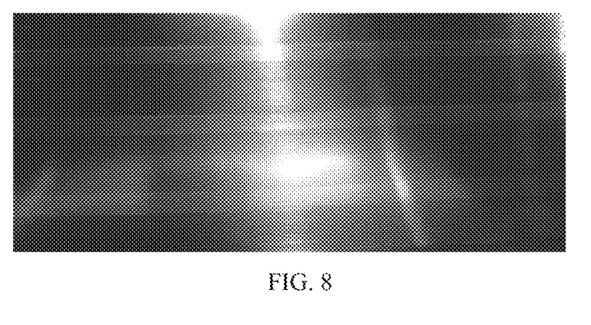
FIG. 8 is a photograph of the product prepared according to Embodiment 7 of the present invention.

(6) The strip obtained in step (5) is subjected to a finish machining on a four-roller reversible finishing mill to obtain the final thickness of 0.1 mm. After inspection, the strip passes through the inspection tool without leaking copper (as shown in FIG. 8), and the performance meets the requirements in the drawings.

In the present invention, by using the improved four-roller solid-phase rolling mill, the product cracking and the silver layer shift are effectively reduced, and the production efficiency is improved. Since the four-roller set exerts a certain pressing and limiting action on the material, the interface bonding of the material is increased, the lateral extension of the material is reduced, and the finished product rate of the product is greatly improved. Moreover, compared with the conventional process, using the four-roller set for production, a product with a large single weight can be produced and the production efficiency is improved.

In the prior art, the method of rolling using the four-roller set has not been used. During the deformation process, due to the different lateral width spreads of the upper surface and the lower surface of the material, the positioning silver layer is shifted. Meanwhile, the energy applied to the material by the device is partially consumed by the extension in the width direction, and it is difficult to form an effective molecular combination at the interface, resulting in a poor bonding strength.

Therefore, the above method of the present invention and the improved rolling method using four-roller set effectively solve the material cracking and the silver layer shift, greatly improving the production efficiency.

According to the above embodiments, preparing the alternating arrangement silver-copper lateral composite strip using the present invention can effectively reduce the phenomena such as strip cracking, silver layer shift, etc. Meanwhile, the bonding strength of copper and silver in the strip is obviously improved, the production cycle is shortened, and the production efficiency is greatly improved.

The specific embodiments of the present invention have been described above. It is noted that the present invention is not limited to the specific embodiments described above, and variations or modifications may be made by those skilled in the art within the scope of the claims, which does not affect the essence of the present invention.

What is claimed is:

1. A method for preparing an alternating arrangement silver-copper lateral composite ingot, wherein the composite ingot is formed by splicing the silver-copper dissimilar metals by the alternating arrangement lateral composite method, the method comprises the following steps:
   limiting the alternating arrangement of the silver-copper lateral composite ingot by using a concave roller set, wherein the concave roller set is a pair of concave working rollers in a roller system of a four-roller solid-phase rolling mill, and grooves are provided at center positions of the concave working rolls;
   manufacturing a copper frame having a fixed width according to a negative tolerance of a width of the groove of the concave working roller and a width of an arrangement of copper bars and silver bars; and
   wherein the copper bars and the silver bars are arranged at intervals, and the arranged copper bars and the silver bars are placed into the copper frame to form the alternating arrangement silver-copper lateral composite ingot.

2. The method for preparing the alternating arrangement silver-copper lateral composite ingot of claim 1, wherein, the copper frame, the copper bars and the silver bars are subjected to a surface treatment, the surface treatment is a degreasing treatment and/or a surface grinding treatment.

3. The method for preparing the alternating arrangement silver-copper lateral composite ingot of claim 2, wherein, the copper frame and the copper bars are subjected to a pass of softening annealing treatment in a furnace protected by a gas before the surface treatment.

4. The method for preparing the alternating arrangement silver-copper lateral composite ingot of claim 3, wherein, in the softening annealing treatment, an annealing temperature ranges from 500° C. to 800° C., a hydrogen atmosphere is provided, and a gas pressure in the furnace is greater than an atmospheric pressure, a gas flow rate ranges from 0.4 $m^3$/h to 0.6 $m^3$/h, and an annealing time ranges from 1 hour to 3 hours.

5. The method for preparing the alternating arrangement silver-copper lateral composite ingot of claim 1, wherein, in the concave working roller, the grooves have a width of 130-160 mm and a depth of 3-6 mm.

6. The method for preparing the alternating arrangement silver-copper lateral composite ingot of claim 1, wherein, the copper frame is a rectangular copper frame having a length L ranging from 500 mm to 2000 mm, a width W ranging from 129 mm to 129.5 mm, and a thickness h ranging from 6 mm to 40 mm.

7. The method for preparing the alternating arrangement silver-copper lateral composite ingot of claim 6, wherein, the copper bars and the silver bars are obtained by cutting after an extrusion forming process, having a length L1 equal to L minus 50 mm, a thickness equal to a thickness of the copper frame, and a width W1 of 3 mm to 50 mm.

8. A method for preparing an alternating arrangement silver-copper lateral composite strip, using the alternating arrangement silver-copper lateral composite ingot of claim 1 as a raw material, comprising the following steps:
   S1, limiting the alternating arrangement silver-copper lateral composite ingot by the grooves of the concave roller, and performing a cold bonding with a deformation amount X ranging from 50% to 85% on the alternating arrangement silver-copper lateral composite ingot to form an alternating arrangement silver-copper lateral composite strip; wherein the concave roller is configured to limit the alternating arrangement silver-copper lateral composite ingot, and the silver-copper interface is fully extruded and deformed during rolling, and a preliminary physically mechanical engagement is formed on a newly formed silver-copper interface;
   S2, performing a diffusion annealing treatment on the alternating arrangement silver-copper lateral composite strip obtained in the step S1 under a protective atmosphere, and a bonding mode of the silver-copper interface is changed from the preliminary mechanical engagement to a combined action of the mechanical engagement and a metallurgical bonding, further improving a bonding strength of the silver-copper interface;
   S3, performing a multi-pass rolling on the alternating arrangement silver-copper lateral composite strip obtained after the diffusion annealing treatment in the step S2 on a four-roller solid-phase rolling mill; and
   S4, performing a softening annealing treatment on the alternating arrangement silver-copper lateral composite strip after rolled in the step S3 under a controllable atmosphere to obtain the alternating arrangement silver-copper lateral composite strip.

9. The method for preparing the alternating arrangement silver-copper lateral composite strip of claim 8, wherein, in the step S1, the deformation amount X is equal to $(h-h1)/h$, wherein h is a thickness of the composite ingot, and h1 is a thickness of the alternating arrangement silver-copper lateral composite strip.

10. The method for preparing the alternating arrangement silver-copper lateral composite strip of claim 8, wherein, in the step S2, in the diffusion annealing treatment performed under the protective atmosphere, an annealing temperature ranges from 500° C. to 800° C., the protective gas is hydrogen gas and a gas pressure in a furnace is greater than an atmospheric pressure, a gas flow rate ranges from 0.4 $m^3/h$ to 0.6 $m^3/h$, and an annealing time ranges from 3 hours to 8 hours.

11. The method for preparing the alternating arrangement silver-copper lateral composite strip of claim 8, wherein, in the step S3, in the multi-pass rolling, a deformation amount Xn of each pass is controlled to range from 10% to 15%, and a total deformation amount Y is controlled to range from 30% to 60%.

12. The method for preparing the alternating arrangement silver-copper lateral composite strip of claim 11, wherein, the total deformation amount Y is equal to a sum of X1+X2+ . . . +Xn, and the deformation amount of each pass is a ratio of a change amount of a thickness of the alternating arrangement silver-copper composite strip at an end of each pass to a thickness of the alternating arrangement silver-copper lateral composite strip before each pass.

13. The method for preparing the alternating arrangement silver-copper lateral composite strip of claim 8, wherein, in the step S4, in the softening annealing treatment under the controllable atmosphere, an annealing temperature ranges from 400° C. to 600° C., the atmosphere is hydrogen gas and a gas pressure in the furnace is greater than an atmospheric pressure, a gas flow rate ranges from 0.4 $m^3/h$ to 0.6 $m^3/h$, and an annealing time ranges from 2 hours to 6 hours.

14. The method for preparing the alternating arrangement silver-copper lateral composite ingot of claim 2, wherein, the copper frame is a rectangular copper frame having a length L ranging from 500 mm to 2000 mm, a width W ranging from 129 mm to 129.5 mm, and a thickness h ranging from 6 mm to 40 mm.

15. The method for preparing the alternating arrangement silver-copper lateral composite ingot of claim 3, wherein, the copper frame is a rectangular copper frame having a length L ranging from 500 mm to 2000 mm, a width W ranging from 129 mm to 129.5 mm, and a thickness h ranging from 6 mm to 40 mm.

16. The method for preparing the alternating arrangement silver-copper lateral composite ingot of claim 4, wherein, the copper frame is a rectangular copper frame having a length L ranging from 500 mm to 2000 mm, a width W ranging from 129 mm to 129.5 mm, and a thickness h ranging from 6 mm to 40 mm.

17. The method for preparing the alternating arrangement silver-copper lateral composite ingot of claim 5, wherein, the copper frame is a rectangular copper frame having a length L ranging from 500 mm to 2000 mm, a width W ranging from 129 mm to 129.5 mm, and a thickness h ranging from 6 mm to 40 mm.

\* \* \* \* \*